2 Sheets—Sheet 1.

W. M. CARRIKER.
CORN-PLANTER.

No. 175,925. Patented April 11, 1876.

WITNESSES
George H. Lamuel
Chas. R. Searle

INVENTOR.
William M. Carriker.
Gilmore & Co.
ATTORNEYS

N. PETERS, PHOTO-LITHOGRAPHER, WASHINGTON, D. C.

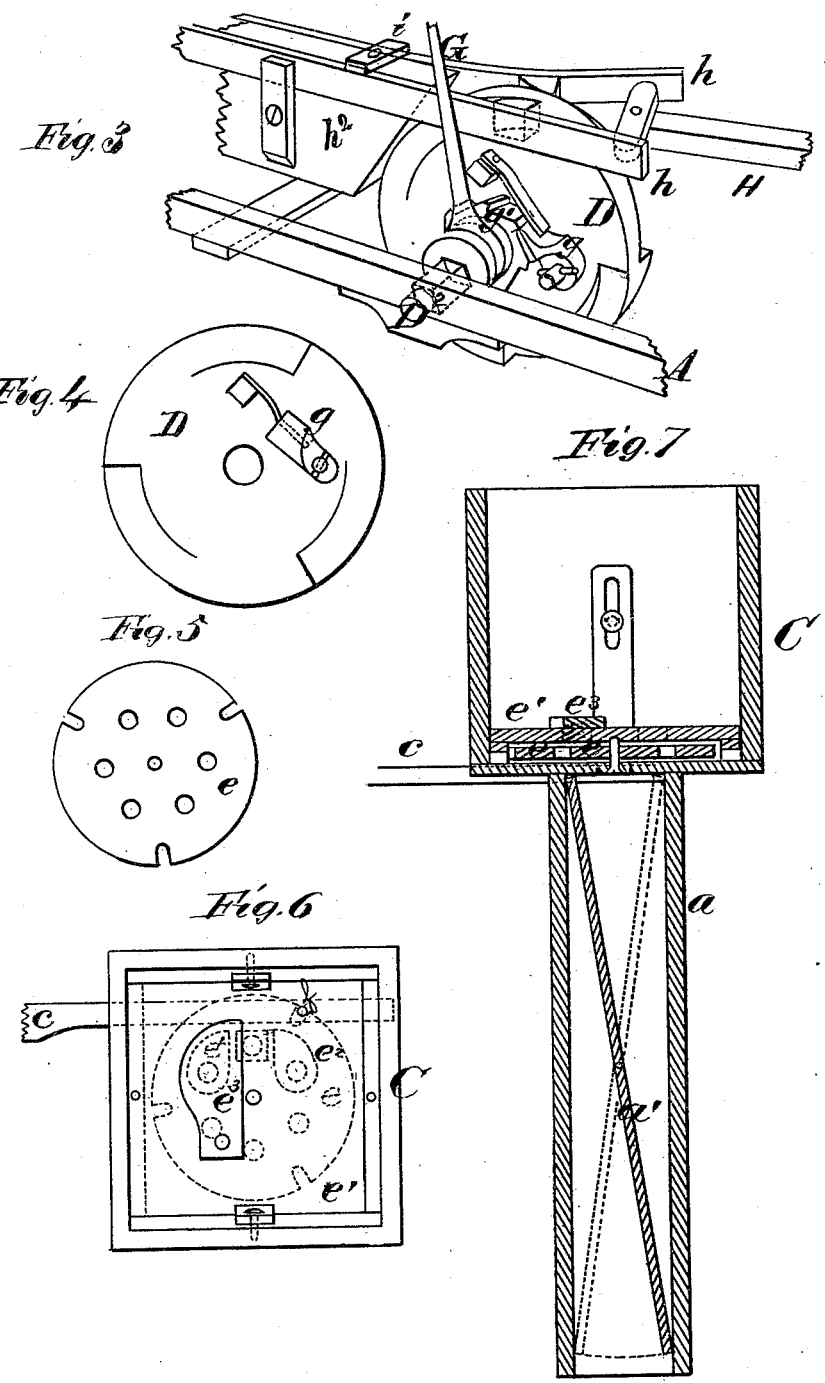

UNITED STATES PATENT OFFICE.

WILLIAM M. CARRIKER, OF IRVING, ILLINOIS.

IMPROVEMENT IN CORN-PLANTERS.

Specification forming part of Letters Patent No. 175,925, dated April 11, 1876; application filed February 12, 1876.

*To all whom it may concern:*

Be it known that I, WILLIAM M. CARRIKER, of Irving, in the county of Montgomery and State of Illinois, have invented a new and valuable Improvement in Corn-Planters; and I do hereby declare that the following is a full, clear, and exact description of the construction and operation of the same, reference being had to the annexed drawings, making a part of this specification, and to the letters and figures of reference marked thereon.

Figure 1:
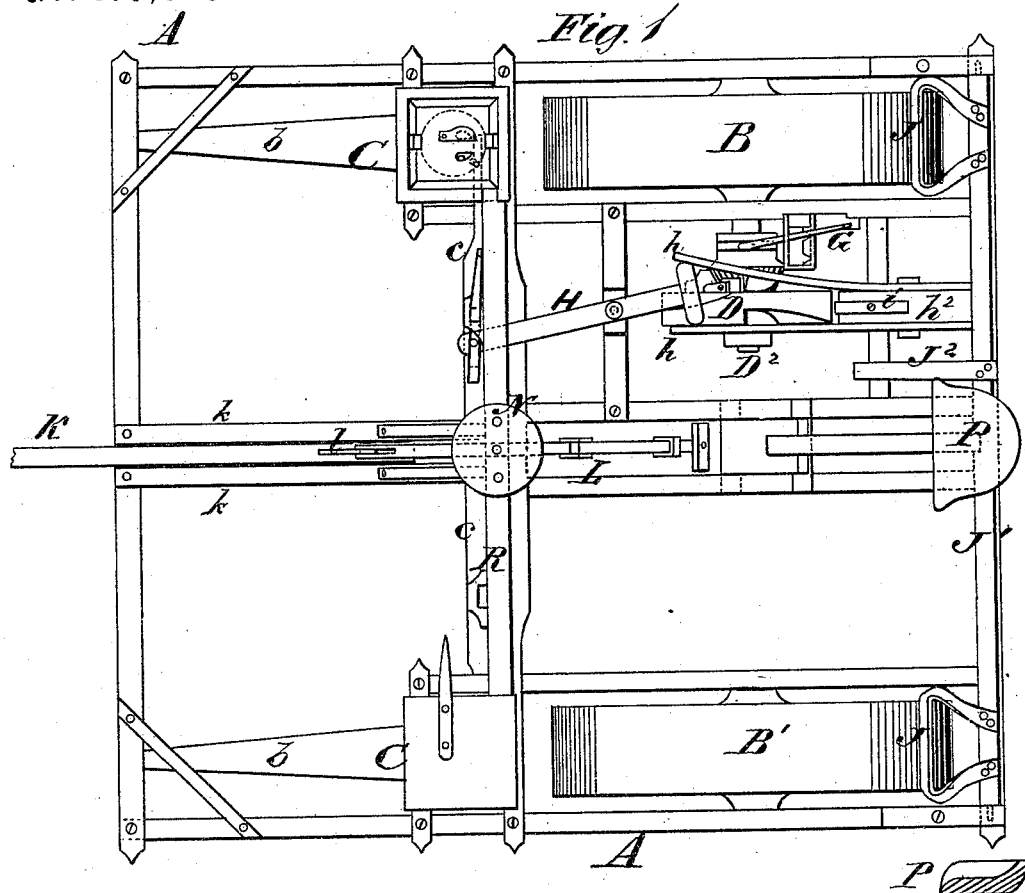
Figure 2:
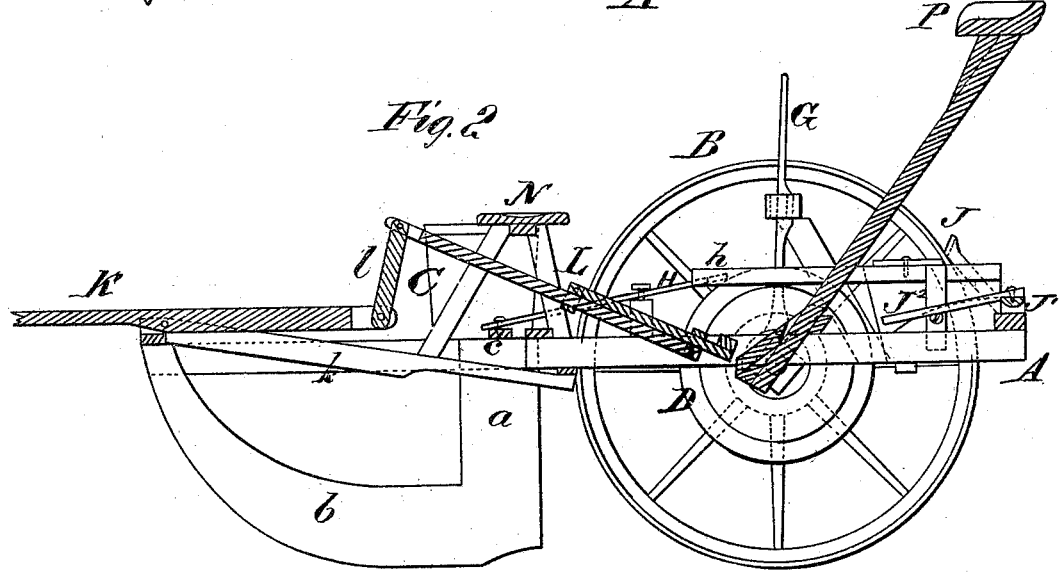

Figure 1 of the drawings is a representation of a plan view of my corn-planter, and Fig. 2 is a longitudinal vertical sectional view of the same. Figs. 3, 4, 5, and 6 are plane detail views thereof, and Fig. 7 is a sectional detail view.

This invention has relation to machines which are designed for planting corn; and the nature of my invention consists in certain novel devices for dropping the grains in any desired number and in hills at any desired distance apart; also, in novel devices for giving a reciprocating motion to the seed-slide when it is desired to drop automatically, as will be hereinafter explained.

In the annexed drawings, A designates the main frame of the machine, which is mounted on two transporting-wheels, B B', having short axles. C C are the hoppers, which, with their tubes $a$, openers $b$, and seed-slide $c$, are arranged in front of the wheels B B'. On the bottom of each hopper C is pivoted a disk, $e$, which has a concentric circle of holes through it, varying in size according to the quantity of seed to be dropped at each throw of the disk.

The disk shown in Fig. 5 has three pairs of holes varying in diameter. Other disks may be employed having holes differing in their diameter from those shown in the disk above referred to.

The disks $e$ have notches in their peripheries corresponding to the pairs of perforations, and one or the other of these notches receives a pin, $f$, which is on the slide $c$. On top of each disk $e$ is a removable cover, $e^1$, through which are two holes, $e^2$ $e^2$, in close relation to each other, one of which can be covered by a pivoted valve, $e^3$, when it is desired to discharge from one hole only.

By this construction the driver can, at pleasure, cover partially or entirely one of the holes, thereby varying the amount of seed sown, dependent on the nature of the soil.

The grains fall from each hopper through a hole in its bottom, and drop to the bottom of the conductor $a$, where they are temporarily arrested by a valve, $a'$, which is vibrated by the slide $c$, and discharges the grains at each stroke into the furrow made by the opener $b$. The axle of the transporting-wheel B is elongated inward, and has a tappet-wheel, D, applied on it, having any desired number of tappets, according to the number of strokes it is desired to give the slide $c$ at each revolution of said wheel. On one side of the wheel D a spring-pawl, $g$, is pivoted, which engages with a ratchet-wheel, $g'$, on axle $D^2$, and causes this axle to turn wheel D when the machine is moved forward. When the machine is moved backward wheel D will not be turned. On opposite sides of the tappet-wheel D are spring-fingers $h\ h$, with beveled teeth on them, which bear against the sides of wheel D, so that, as this wheel revolves, it will give quick vibrating motions to the spring-fingers $h\ h$. These fingers are pivoted to a block, $h^2$, and when a button, $i$, is turned over them they will be held down in positions to be acted on by the tappet-wheel D.

By means of a hand-lever, G, which is pivoted to a standard rising from the main frame, the ratchet-wheel $g'$ can be adjusted endwise on its axle, and thus engaged with the pawl $g$, or disengaged from it.

Between the free ends of the spring-fingers $h\ h$ is the T-head of a laterally-vibrating lever, H, the front end of which lever is jointed to the slide $c$. Thus when the machine is being moved forward, the seed-slide will receive endwise movement by the fingers $h\ h$ alternately striking the ends of the T-head of lever H. The peripheries of wheels B B' can be kept clear by means of scrapers J J, which are secured to a rear oscillating bar, $J^1$, and pressed upon the wheels B B' by the driver, who places his foot upon a treadle, $J^2$. K designates the draft-tongue, which is pivoted between the front ends of two longitudinal bars, $k\ k$, and connected by a link, $l$, to the front section of an extensible lever, L, which is pivoted between standards of a front dropper's seat, N. The rear section of lever L is allowed to slide on the front pivoted section thereof, and has a foot-rest on its rear end to be operated by a driver sitting in the longitudinally-adjustable seat P. The foot-rest on lever L can be adjusted conveniently to the driver in seat P, whether this seat be in a forward or backward position.

When the driver is dropping in check-rows he is located on the seat N, and actuates the slide $c$ by means of a hand-lever passed through one of two holes in a bar, R, and said slide.

What I claim as new, and desire to secure by Letters Patent, is—

1. The hoppers C, having seed-tubes $a$, in which are pivoted oscillating valves $a'$, in combination with perforated disks actuated by the slide $c$, and with floors $e^1$, perforated and provided with cut-offs $e^3$, substantially as described.

2. In combination with the pivoted draft-pole K, link $l$, and extensible lever L, the longitudinally-adjustable seat P, substantially as described.

In testimony that I claim the above I have hereunto subscribed my name in the presence of two witnesses.

WILLIAM M. CARRIKER.

Witnesses:
EDMUND CARRIKER,
S. F. KING.